Patented Oct. 24, 1944

2,361,059

UNITED STATES PATENT OFFICE 2,361,059

PROCESS FOR MANUFACTURING PIGMENTS

Campbell Robertson, Westfield, N. J., assignor to E. I. du Pont de Nemours & Company, Wilmington, Del., a corporation of Delaware No Drawing. Application June 16, 1941,
Serial No. 398,254

7 Claims. (Cl. 83—9)

This invention relates to the manufacture of pigments, and is particularly concerned with a new and improved process for producing pigments having tinctorial strengths greater than those now obtainable. The invention is primarily concerned with the production of calcined pigments, pigments which in the course of manufacture are subjected to calcination, rather than with the preparation of coloring bodies by simple precipitation and drying. The improved manufacturing method forming the subject matter of this application particularly relates to securing increased tinctorial strengths in such pigments by subjecting them to milling or grinding in a ball mill employing relatively small glass beads instead of the usual porcelain, flint, or steel balls.

In the commercial manufacture of pigments, there are several factors which determine the commercial utility of a specified coloring body. These factors are: first, strength, or the ability of the pigment in given amount to impart the desired degree of coloration; second, stability; and third, the cost of manufacture. Quantitative determinations of these factors for any particular pigment cannot always be secured, since the stability of a pigment, for example, may vary widely, depending upon the type of vehicle in which the pigment is employed, and on the exact extent of stress to which it may be subjected during application or use. Similarly, the tinctorial strength of a pigment can ordinarily be expressed only empirically, in terms of a comparative test carried out under specified test conditions, the results always being expressed in terms of the tinctorial strength of some pigmentary material employed as a reference material. Finally, the cost factor, or the cost of producing a given pigment commercially, may depend to some extent upon the quantity of the pigment sold. In spite of the difficulty of expressing these attributes of any given pigment in a definite numerical value, they can always be determined for any given material at least in a relative way, and so determined, constitute the chief factors affecting the overall commercial value of the pigment.

Some pigments are made by simple precipitation followed by drying, while in other cases the pigment, after precipitation, is subjected to calcination. Calcining a pigment, i. e., treating it at an elevated temperature, generally results in a product which is more stable than pigments manufactured by simple precipitation without calcination. However, calcined pigments have in the past always had relatively low tinctorial powers as compared with pigments prepared by simple precipitation. The tinctorial power of a pigment is a measure of the amount of coating material that will be satisfactorily colored to the desired hue by a specified amount of a pigment. Low tinctorial power not only necessitates the use of a larger quantity of the pigment in order to secure the desired color effect, thereby increasing the over-all net cost per unit quantity of the product in which the pigment is used, but may also require the use of such large quantities of a pigment that it may have a detrimental effect on the product, a disadvantage distinct from and in addition to the increased expense.

It is one of the objects of my invention to produce pigments, particularly pigments prepared by calcination, which pigments will have greatly increased tinctorial strengths over the strengths now obtainable with the usual calcined pigments. It is moreover another object of this invention to produce this increased tinctorial strength without sacrificing any of the other desirable properties characteristic of calcined pigments, such for example, as stability and permanence. Still another object of this invention is to secure these increases in tinctorial strength without excessive cost and by means of a process which is readily reproducible in pigment manufacturing establishments to give uniformly consistent and improved results when applied generally in the commercial manufacture of pigments. These and still other objects will be apparent from the ensuing disclosure of certain improved embodiments of my invention.

In general, these objects are attained by grinding or milling the pigment in a ball mill of the usual type, however, utilizing small glass beads as the grinding media in place of the customary porcelain, flint, or steel balls. I have discovered that the tinctorial strengths of calcined pigments may be greatly improved by grinding them by means of small glass beads in ball mills, this operation being carried out in place of, or in addition to, the usual operation wherein the pigment is ground by the action of porcelain, flint, or steel balls. This improved tinctorial strength is attained without sacrificing any of the other advantages characteristic of pigments of the calcined type.

In efforts to improve the tinctorial strengths of calcined pigments, attempts have been made in the past to grind these pigments to extremely fine particle size by treatment in ball mills or in other types of grinding mills. Ball mills have, in general, proved to be efficient in action for reducing the particle size of the calcined pigments, but unfortunately investigation has shown that a definite peak in tinctorial strength is reached after ball milling for a definite period of time, usually a few hundred hours. Grinding beyond this point usually not only fails to produce an additional increase in tinctorial strength, but may actually lower the strength. Moreover, the peak tinctorial strength obtained by ball milling these pigments is in most cases far short of the tinctorial strengths commonly obtained with uncalcined pigments. For this reason, it has been generally agreed in the past that the tinctorial power of calcined pigments is necessarily very low and that this was a disadvantage which had to be accepted by the industry if the other advantages of a calcined pigment were to be secured. As the result, the use of calcined pigments in the industry has been necessarily somewhat impeded, manufacturers being generally willing to endure the characteristic low tinctorial strength only when this disadvantage was outweighed by the other characteristic advantages of the calcined type of pigment.

I have now discovered a procedure by which very large increases in the tinctorial strengths of pigments of the calcined type may be secured, these increases in strength in many cases being sufficient to impart to the calcined pigment a strength substantially equivalent to that obtainable with an uncalcined pigment. While in some cases my process does not increase the tinctorial strength of the calcined pigment to a degree sufficient to make it equivalent in strength to an uncalcined pigment, in all cases my procedure results in tinctorial strength increases of outstanding commercial value.

It has been observed that a substantial increase in the tinctorial strength of a calcined pigment can be secured by milling the pigment, in the form of a thin suspension in a liquid medium, in an ordinary ball mill, employing in the place of the usual balls, small glass beads. These small glass beads should be in the form of smooth spheres and should ordinarily have diameters of ⅜ inch or less. Preferably, the small glass beads should have diameters ranging from 1/16 inch to ⅜ inch. These glass beads may be formed out of ordinary glass, and should have smooth surfaces and be generally spherical in form.

The ball mill that I prefer to use is one of the usual type, consisting of a cylindrical member rotating about a horizontal axis at a speed less than that sufficient to carry the contents around with the cylinder, as it rotates, through the action of centrifugal force. The pigment to be ground must be in the form of a relatively thin slip. Ordinarily I prefer to use water as the suspending liquid for reasons of economy and convenience, but almost any thin organic liquid is equally usable, and is undesirable, as compared with water, only in that its use may increase the manufacturing cost. The pigmentary material being ground should be one which has first been reduced to a fineness wherein the particles do not exceed in size a mean diameter of about ten microns. Where the mean diameter exceeds ten microns after calcination, the pigment must first be subjected to ball milling in the conventional type of ball mill, or otherwise first ground to the desired fineness. Of course, if the calcined material does not exceed ten microns mean diameter, it may be immediately subjected to milling in a ball mill employing the glass beads, without preliminary grinding with the usual porcelain, flint, or steel balls.

The possibility of utilizing glass grinding elements in place of the usual porcelain balls or flint pebbles has hitherto been considered impractical, since it has been the general opinion either that they would not grind the pigment, or that they would be themselves worn away so fast as to render the operation commercially impractical. Moreover, in a number of standard treatises on ball milling, where the principles underlying the milling of pigments have been theoretically considered, it is stated as a general principle that media of the non-metallic type in ball mills should not be smaller in size than that corresponding to a diameter of about ¾ inch, if effective grinding is to be secured. For example, in Technical Paper 581 of the Bureau of Mines, a paper entitled "Ball mill grinding," it is pointed out that the optimum ball size for effective milling is from 1 to 1½ inches in diameter. In view of these conclusions by specialists in ball milling, it is indeed surprising that such superior results and increased tinctorial strengths are obtained by using small glass beads ranging in diameter from 1/16 inch to ⅜ inch as the grinding media. This improved principle of milling departs entirely from the generally accepted concept that the mass of the grinding pellet is of importance. As far as I can determine, the effectiveness of grinding and the increased tinctorial strength produced in pigments is not in any manner reduced by using grinding particles of extremely small mass. The limiting factor on the size of the small glass spheres is not the mass of the individual spheres, or any effect on grinding resulting from that mass, but rather the practical problem of securing glass balls in the form of extremely fine spheres. Since the cost of securing glass in the form of fine spherical globules is much increased when the diameter of the particle is below ¼ inch, at the present time, I prefer to use glass beads having a diameter of approximately ¼ inch. Such beads are obtainable commercially at a cost which is not excessive, and appear to be generally as effective as glass particles of somewhat smaller diameter.

I have found that the glass composition from which the beads are formed is not a critical matter. The beads that I have used in milling a number of pigmentary materials were made from ordinary soda-lime-silica glass, as commonly used for bottles and other glass articles.

As an illustration of the degree of increased tinctorial strength which can be secured by milling a calcined pigment in a ball mill containing small glass beads as the grinding media, the following tests with a typical calcined cadmium sulfoselenide red pigment may be cited. This pigment contained approximately 53% of cadmium sulfide and 47% of cadmium selenide and was a brilliant scarlet red.

The tinctorial strength of such a pigment may, for practical purposes, be determined by using the customary "rub out" technique commonly used in the pigment and ink industries. In this test the pigment is mulled wtih a white opacifier and an oil vehicle in fixed proportions to make a pale pink paste, which paste is then spread out into a thin layer on a piece of paper. The stronger the tinctorial strength of the pigment, the more intense or deep in coloration will be the paste. A very weak pigment gives a nearly white paste, while a pigment of very high tinctorial strength gives a paste which is practically red in color, for the same ratios of pigment to opacifier and oil. Using such a comparison type of test, quantitative comparisons may be made by reducing the amount of a strong pigment introduced into the mixture of pigment, opacifier, and oil, until the color tint approximately matches that produced with a weaker pigment in a paste containing, however, a greater amount of the pigment. In this way the tinctorial strength may be expressed as the ratio of the amount of pigment of high tinctorial strength used to the amount of pigment of weak tinctorial strength used to prepare pastes of identical coloration.

The cadmium sulfoselenide red pigment described above was subjected to ball milling, in accordance with my improved procedure, the ball mill containing spherical glass beads of approximately ¼ inch diameter. The ball mill was loaded to approximately half its volume with glass beads and the weight of pigment introduced into the mill was approximately ⅓ the weight of the beads. Water was then added equivalent in amount to 150% by weight of the weight of the pigment. The ball mill was closed and operated at a rotational speed just below its critical speed for a grinding period of approximately 100 hours. The mill was then opened, the pigment slip separated from the glass beads, and the pigment filtered to free it from the milling liquid. The pigment was then dried and subjected to the "rub out" test as above described, the comparison being made with the same cadmium sulfoselenide pigment, but pigment which had not been subjected to the milling operation. This test showed that ball milling with the glass beads had approximately doubled the tinctorial strength of the unmilled cadmium sulfoselenide pigment.

For purposes of comparison, the ball mill was then loaded with conventional type porcelain balls, the trials being made with various sizes ranging from ¾ inch diameter to 1¼ inch diameter. The pigment was then introduced into the mill, together with approximately 150% by weight of water based on the weight of the pigment. Milling for approximately 100 hours with porcelain balls, in accordance with the usual practice, was found to increase the tinctorial strength of the cadmium sulfoselenide pigment only to a relatively minor degree, an increase of approximately 10% in tinctorial strength over that of the unmilled pigment being observed. Regardless of the period of time that milling with the porcelain balls was continued, I have never been successful in securing a tinctorial strength anywhere near equivalent to that attainable by milling the pigment for approximately 100 hours in a ball mill loaded with the small glass beads.

While the foregoing illustration of the use of my process for increasing the tinctorial strength of pigments refers to a cadmium sulfoselenide red pigment, the same procedure is applicable and corresponding results are obtained with other calcined pigments of diverse chemical types, such for example, as the cobalt aluminate blue pigments, the chromium green pigments, and the cobalt-iron-chromium blacks. In fact, any type of calcined pigments can be treated to give the desired increased tinctorial strength, there being only slight variations in each case in the ratio of pigment weight to weight of glass beads and the quanttiy of milling liquid present required to give greatest efficiency in milling. My improved procedure is generally most effective for treating those pigments which are of low initial tinctorial strength. While my procedure may be applied to uncalcined pigments and may produce some increase in the tinctorial strengths of those pigments, generally these pigments have initial high tinctorial properties, and my improved grinding procedure will not result in any such marked increase as that secured when pigments of relatively low tinctorial strengths, such as the calcined pigments, are so treated.

Throughout specification and claims the word pigment, as employed herein, is used in its broadest sense to include white pigments or opacifying agents as well as colored pigmentary materials. Both are equally subject to improvement in tinctorial strength by the use of my improved procedure.

It is obvious that my improved method of increasing the tinctorial strengths of pigments is of general application and that it is not to be restricted to precise conditions or amounts given herein as illustrative. The scope of my invention is therefore to be determined in accordance with the prior art and appended claims.

I claim:

1. A process for treating calcined pigments which comprises milling the pigment in the form of a thin suspension in a liquid medium in a ball mill loaded with glass beads, said glass beads being approximately spherical in shape and of a size less than about ⅜ inch in diameter.

2. A method for treating calcined pigments which comprises milling said pigments in the form of a thin suspension in a liquid medium in a ball mill loaded with glass beads, said glass beads being approximatly spherical in shape and of a size ranging from $\frac{1}{16}$ inch in diameter to ⅜ inch in diameter.

3. A method for treating calcined pigments in order to improve their tinctorial strengths which comprises milling the pigment in the form of a thin suspension in a liquid medium in a ball mill loaded with glass beads, said glass beads being approximately spherical in shape and about ¼ inch in diameter.

4. A method for treating a calcined pigment of particle size not greater than approximately 10 microns mean diameter in order to improve its tinctorial strength which comprises milling the pigment in the form of a thin suspension in a liquid medium in a ball mill loaded with glass beads, said glass beads being approximately spherical in shape and of a diameter less than approximately ⅜ inch.

5. A process for treating calcined pigments which comprises milling the pigment in the form of a thin suspension in a liquid medium in a ball mill loaded with glass beads, said glass beads being approximately spherical in shape and of size less than ⅜ inch in diameter, and said milling being continued for a period of approximately one hundred hours.

6. A method for treating calcined pigments which comprises milling the pigment in the form of a thin suspension in a liquid medium in a ball mill loaded with glass beads, said beads being approximately spherical in shape and of size ranging from $\frac{1}{16}$ inch in diameter to ⅜ inch in diameter, said milling being continued for approximately one hundred hours.

7. A method for treating a calcined pigment in order to improve its tinctorial strength which comprises milling said pigment in a ball mill of ordinary type until the mean diameter of the particles of the pigment is reduced to 10 microns or less, and then milling the pigment in the form of a thin suspension in a liquid medium in a ball mill loaded with glass beads of substantially spherical shape, said glass beads ranging in size from about $\frac{1}{16}$ inch in diameter to about ⅜ inch in diameter.

CAMPBELL ROBERTSON.